US012720011B2

(12) United States Patent
McCaffrey et al.

(10) Patent No.: US 12,720,011 B2
(45) Date of Patent: Aug. 25, 2026

(54) DUPLICATE FRAME DETECTION IN MULTI-CAMERA VIEWS FOR AUTONOMOUS SYSTEMS AND APPLICATIONS

(71) Applicant: NVIDIA CORPORATION, Santa Clara, CA (US)

(72) Inventors: Jonathan Baird McCaffrey, Santa Clara, CA (US); Richard Gavin Bramley, Santa Clara, CA (US); Prashant Chandrasekhar, San Ramon, CA (US); Sang Hun Lee, Surrey (CA); Sujay Raghavendra Yadawadkar, Santa Clara, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 146 days.

(21) Appl. No.: 18/177,686

(22) Filed: Mar. 2, 2023

(65) Prior Publication Data

US 2024/0297963 A1 Sep. 5, 2024

(51) Int. Cl.

*H04N 7/18* (2006.01)
*G06T 7/80* (2017.01)
*H04N 5/265* (2006.01)

(52) U.S. Cl.

CPC ............... *H04N 7/181* (2013.01); *G06T 7/80* (2017.01); *H04N 5/265* (2013.01); *G06T 2207/10016* (2013.01); *G06T 2207/30252* (2013.01)

(58) Field of Classification Search

CPC .......... H04N 7/181; H04N 5/265; G06T 7/80; G06T 2207/10016; G06T 2207/30252;

(Continued)

(56) References Cited

U.S. PATENT DOCUMENTS

2009/0147861 A1* 6/2009 Schnebly ............. H04N 19/467 375/240.27
2013/0063606 A1* 3/2013 McClay ............... H04N 17/004 348/181

(Continued)

FOREIGN PATENT DOCUMENTS

WO WO-2023283540 A1 * 1/2023 ............... G06T 5/50

OTHER PUBLICATIONS

Swindon Silicon Systems, "Functional Safety Methodologies For Automotive Applications", Retrieved from https://www.swindonsilicon.com/functional-safety-methodologies-for-automotive-applications/, on Dec. 13, 2022, 12 pages.

(Continued)

*Primary Examiner* — William C Vaughn, Jr.
*Assistant Examiner* — Asteway Gettu Zewede
(74) *Attorney, Agent, or Firm* — Squire Patton Boggs LLP; Sarah Mirza

(57) ABSTRACT

In various examples, a technique for performing transformation-invariant detection of duplicate frames includes determining a first sequence number for a first output frame, where the first output frame includes one or more views captured using one or more cameras. The technique also includes performing a first comparison of one or more pixel values from the first output frame. The technique further includes based at least on the sequence number not corresponding to the one or more pixel values, performing one or more operations with respect to the first output frame.

20 Claims, 10 Drawing Sheets

(58) Field of Classification Search

CPC . G06T 2207/10021; G06T 2207/10024; G06T 2207/10028; G06T 2207/10048; G06T 2207/20076; G06T 2207/20081; G06T 2207/20084; G06T 2207/20132; G06T 2207/20221; G06T 2207/30201; G06T 7/00; G06T 7/262; G06T 7/269

USPC .......................................................... 348/148

See application file for complete search history.

(56) References Cited

U.S. PATENT DOCUMENTS

| | | | | |
|---|---|---|---|---|
| 2016/0021384 | A1* | 1/2016 | Croxford | H04N 19/85 375/240.12 |
| 2019/0297362 | A1* | 9/2019 | Glen | H04N 5/272 |
| 2020/0107008 | A1* | 4/2020 | Hur | H04N 13/183 |
| 2022/0200727 | A1* | 6/2022 | Chay | H04L 1/0041 |
| 2022/0374490 | A1* | 11/2022 | Avila | G06T 15/205 |
| 2023/0012219 | A1* | 1/2023 | Feng | G06V 10/25 |
| 2023/0237941 | A1* | 7/2023 | Jeong | G09G 5/003 345/204 |

OTHER PUBLICATIONS

Zhang et al., "A Surround View Camera Solution for Embedded Systems", IEEE Conference on Computer Vision and Pattern Recognition Workshops, 2014, pp. 662-667.

* cited by examiner

DUPLICATE FRAME DETECTION IN MULTI-CAMERA VIEWS FOR AUTONOMOUS SYSTEMS AND APPLICATIONS

BACKGROUND

A modern car, truck, bus, and/or other type of vehicle or machine may be equipped with a camera—or other sensor-based vision—system that captures various views of the environment around the vehicle. These views can be displayed on a screen of the vehicle to assist a driver with various driving-related tasks and/or to inform the driver or other occupants of the surroundings and/or operations of the vehicle. For example, a rearview camera may be activated when the vehicle is placed in reverse to allow the driver to view roads, pedestrians, vehicles, and/or other objects or obstacles in the path of the vehicle as the vehicle moves backward. In another example, multiple camera views may be transformed, stitched, blended, and/or otherwise combined into a top-down, three-dimensional (3D), and/or another visualization of the vehicle's surroundings while the vehicle is being parked or positioned. The driver may additionally interact with a user interface in the vehicle to rotate the visualization, zoom in or out of the visualization, and/or otherwise change the view or perspective associated with the visualization.

In conventional approaches, to detect duplicate (e.g., frozen, delayed, repeated, etc.) frames in a single automotive camera view with a fixed perspective, each frame of the camera view can be divided into multiple regions, and a cyclic redundancy check (CRC) can be computed for each of the regions. The CRC may be compared across frames, and repetitions of the frames are detected when the CRCs computed for the same region in consecutive frames match one another.

However, this CRC-based check cannot be used to reliably detect duplicate frames when one or more camera views are combined into a visualization. In particular, projection, cropping, rotating, stitching, blending, and/or other operations that can be used to combine various camera views into a visualization can cause CRCs and other non-pixel metadata associated with the camera views to be dropped. At the same time, user input that rotates, zooms, and/or otherwise changes the perspective or view associated with the visualization can cause any CRCs computed for regions of the visualization to change, even when the visualization includes duplicated frame content.

As such, a need exists for more effective techniques for improving the detection of duplicate frames in camera views.

SUMMARY

Embodiments of the present disclosure relate to transformation-invariant detection of duplicate frames in automotive camera views. The techniques described herein include determining a first sequence number for a first output frame, where the first output frame includes one or more views captured using one or more cameras. The techniques also include performing a first comparison of the first sequence number with one or more pixel values from the first output frame. The techniques further include based at least on the sequence number not corresponding to the one or more pixel values, performing one or more operations with respect to the first output frame.

One technical advantage of the disclosed techniques relative to conventional solutions is that a sequence number inserted into a set of input frames can be transferred to a corresponding output frame in a manner that is invariant to the transformations performed to convert the input frames into the output frame. Accordingly, the sequence number can be used to detect duplicated frame content in output frames that are generated by rotating, cropping, stitching, blending, and/or otherwise transforming or combining input frames from multiple camera—or other vision-based sensor—views. Further, the disclosed techniques allow duplicated frame content to be detected in an efficient manner by comparing a relatively small number of pixel values within the output frame to a corresponding sequence number.

BRIEF DESCRIPTION OF THE DRAWINGS

The present systems and methods for transformation-invariant detection of duplicate frames in automotive camera views are described in detail below with reference to the attached drawing figures, wherein.

DETAILED DESCRIPTION

Figure 1:
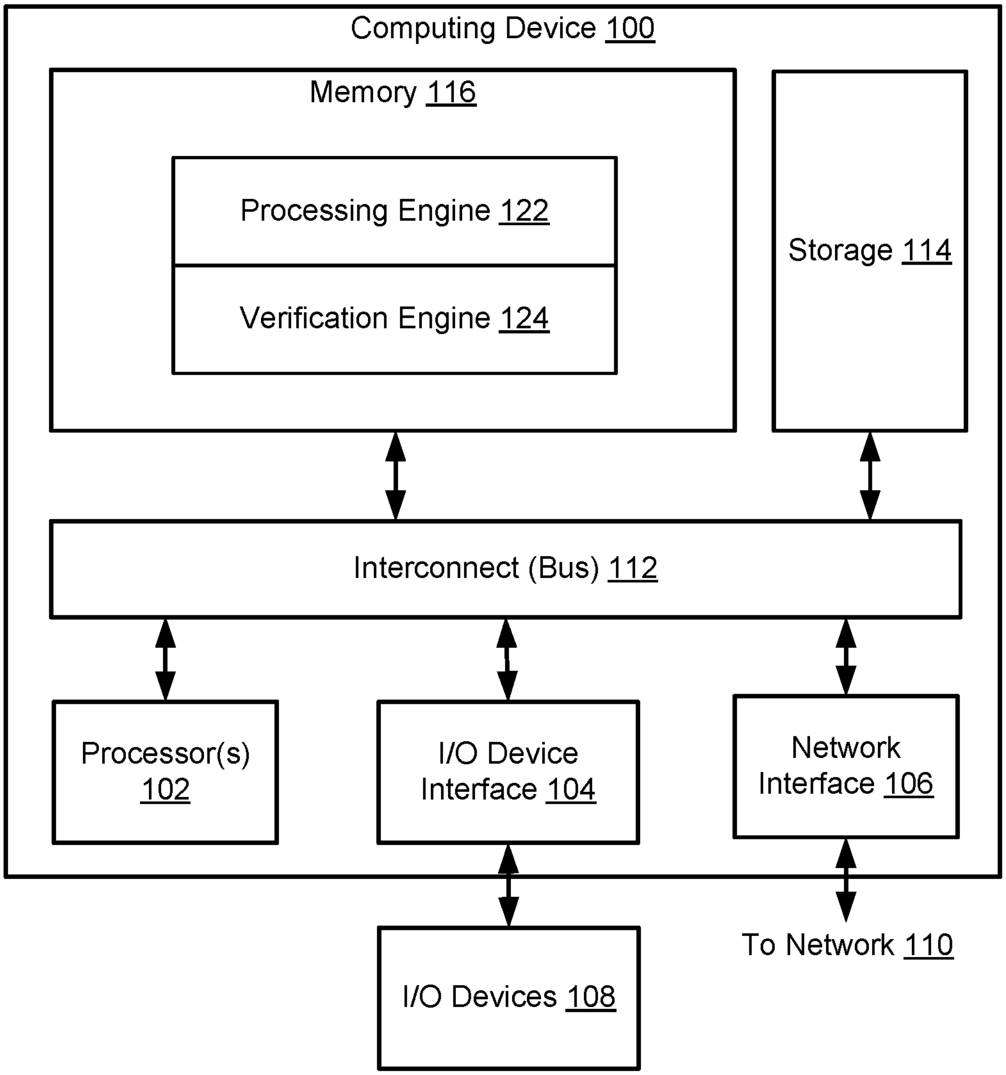
FIG. 1 illustrates a computing device configured to implement one or more aspects of various embodiments.

Systems and methods are disclosed for transformation-invariant detection of duplicate frames in automotive camera views. Although the present disclosure may be described with respect to an example autonomous or semi-autonomous vehicle or machine 500 (alternatively referred to herein as "vehicle 500" or "ego-machine 500," an example of which is described with respect to FIGS. 5A-5D), this is not intended to be limiting. For example, the systems and methods described herein may be used by, without limitation, non-autonomous vehicles or machines, autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to transformation-invariant detection of duplicate frames in automotive camera views, this is not intended to be limiting, and the systems and methods described herein may be used in augmented reality, virtual reality, mixed reality, robotics, security and surveillance, autonomous or semi-autonomous machine applications, and/or any other technology spaces where camera views may be used.

As discussed herein, a cyclic redundancy check (CRC) can be used to detect duplicate frames in a single camera view with a fixed perspective. However, this CRC-based check cannot be used to reliably detect such frame duplication when one or more camera views are combined into a visualization via projection, cropping, rotating, stitching, blending, and/or other transformations because these transformations can cause CRCs and other non-pixel metadata associated with the camera views to be changed or dropped.

To improve the detection of duplicate frames in camera views that have been transformed or combined into visualizations, the disclosed techniques insert a sequence number into the alpha channels of RGBA pixel values in multiple input frames that are combined to generate the output frame. The sequence number is incremented (or decremented) by a fixed or known amount before the sequence number is injected into the next set of input frames used to generate the next output frame of the visualization. The sequence number can be "wrapped around" when the sequence number lies outside a range of valid alpha channel values.

After the sequence number is inserted into a given set of input frames, the input frames are transformed, stitched, blended, and/or otherwise combined into a corresponding output frame. For example, the input frames may be combined to generate a top-down, 3D, or multi-viewport view of an environment around a vehicle or system. During generation of the output frame, the sequence number stored in the alpha channel of pixels in the input frames is transferred to the alpha channel of pixels in the output frame.

Values stored in the alpha channel of the output frame are sampled from a subset of pixels in the output frame and compared to an expected sequence number for the output frame. For example, the alpha channel values may be sampled from pixels in proximity to the corners of the output frame, and the expected sequence number may be determined by incrementing or decrementing a previous value of the expected sequence number. If the sampled alpha channel values correspond to (e.g., match, fall within a range of, etc.) the expected sequence number for the output frame, the output frame is determined to not include duplicated frame content. The output frame can then be blended with an overlay into a visualization that is displayed on a screen in the vehicle.

If any of the sampled alpha channel values do not correspond to the expected sequence number, the output frame is determined to include duplicated frame content. In response, the output frame can be dropped, the screen can be blanked, or another action can be performed to prevent the driver from operating the vehicle using stale, misleading, or less safe than desirable image data.

One technical advantage of the disclosed techniques relative to conventional solutions is that a sequence number inserted into a set of input frames can be transferred to a corresponding output frame in a manner that is invariant to the transformations performed to convert the input frames into the output frame. Accordingly, the sequence number can be used to detect duplicated frame content in output frames that are generated by rotating, cropping, stitching, blending, and/or otherwise transforming or combining input frames from multiple camera views. Further, the disclosed techniques allow duplicated frame content to be detected in an efficient manner by comparing a relatively small number of pixel values within the output frame to a corresponding sequence number.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, an embedded system, a system(s) on a chip(s), an in-vehicle computing device, and/or any other type of computing device configured to receive input, process data, and optionally display images, and is suitable for practicing one or more embodiments. Computing device 100 is configured to run a processing engine 122 and a verification engine 124 that may reside in a memory 116. It is noted that the computing device described herein is illustrative and that any other technically feasible configurations fall within the scope of the present disclosure. For example, multiple instances of processing engine 122 and/or verification engine 124 may execute on a set of nodes in a distributed and/or cloud computing system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a parallel processing unit (PPU), a data processing unit (DPU), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing device 100 may correspond to a physical computing system (e.g., a system in a data center) and/or may correspond to a virtual computing instance executing within a computing cloud.

In at least one embodiment, I/O devices 108 include devices capable of receiving input, such as a keyboard, a mouse, a touch screen, a touchpad, a VR/MR/AR headset, a gesture recognition system, and/or a microphone, as well as devices capable of providing output, such as a display device(s), a haptic device(s), and/or a speaker(s). Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, a cellular network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Processing engine 122 and/or verification engine 124 may be stored in storage 114 and loaded into memory 116 when executed.

In one embodiment, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs that can be executed by processor(s) 102 and application data associated with said software programs, including processing engine 122 and/or verification engine 124.

Processing engine 122 includes functionality to insert sequence numbers into frames captured by a set of cameras. These cameras may capture multiple views of an environment around a vehicle, robotic system, surveillance system, or another type of system that includes computing device 100. The sequence numbers may include monotonically increasing or decreasing values that are injected into alpha channels and/or other per-pixel values of consecutive frames. The sequence numbers can also be "wrapped around" when a given sequence number lies outside a range of valid alpha channel (or other per-pixel) values. Consequently, the sequence numbers can be used to distinguish between consecutive frames captured by the cameras.

Processing engine 122 can also combine multiple frames captured at substantially the same time by multiple cameras into an output frame representing a visualization of the environment surrounding the system. For example, processing engine 122 may use one or more projection, cropping, rotating, stitching, blending, and/or other operations to combine multiple frames depicting multiple views of the environment into an output frame representing a two-dimensional (2D) and/or three-dimensional (3D) visualization, top-down visualization, multi-viewport visualization, and/or other view of the environment. During generation of the output frame, sequence numbers stored in individual pixels of the frames are copied into corresponding pixels of the output frame.

Verification engine 124 uses the sequence numbers stored in the output frame to verify that the output frame does not include image data that is duplicated from one or more previously captured frames. For example, verification engine 124 may compute an expected sequence number for the output frame by incrementing, decrementing, and/or "wrapping around" the sequence number for a previous output frame associated with the same visualization. Verification engine 124 may also sample sequence numbers stored in alpha channels and/or other per-pixel values from a subset of pixels in the output frame. If at least some (e.g., all) of the sampled sequence numbers match or otherwise correspond to the expected sequence number for the output frame, verification engine 124 may determine that the output frame does not include duplicated frame content. The output frame can then be blended with an overlay into a view that is displayed on one or more I/O devices 108.

If any of the sequence numbers sampled from the output frame do not match or otherwise correspond to the expected sequence number, verification engine 124 may determine that the output frame includes duplicated frame content. In response, the output frame can be dropped, and a screen in I/O devices 108 can be blanked to prevent the driver from operating the vehicle using stale, misleading, or unsafe image data.

Figure 2:
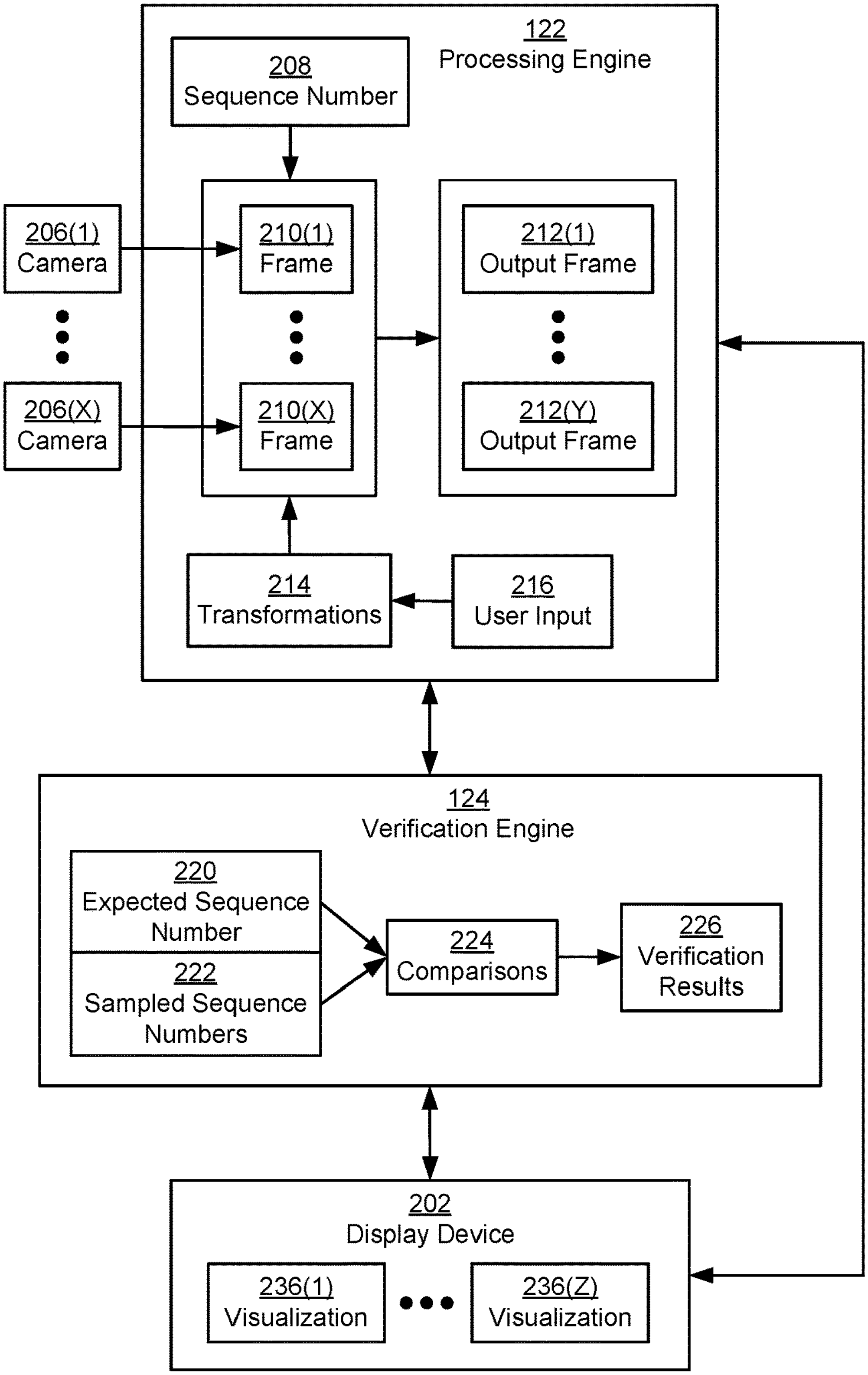
FIG. 2 is a more detailed illustration of the processing engine and verification engine of FIG. 1, according to various embodiments.

FIG. 2 is a more detailed illustration of processing engine 122 and verification engine 124 of FIG. 1, according to various embodiments. As mentioned herein, processing engine 122 and verification engine 124 operate to detect and manage duplicate (e.g., frozen, delayed, repeated, etc.) frames 210(1)-210(X) that are captured by a set of cameras 206(1)-206(X) and used to generate a set of visualizations 236(1)-236(Z). Each of frames 210(1)-210(X) is referred to individually herein as frame 210. Each of cameras 206(1)-206(X) is referred to individually herein as camera 206. Each of visualizations 236(1)-236(Z) is referred to individually herein as visualization 236.

At a given point in time, each camera 206 may generate a corresponding frame 210 that depicts a view of an environment. As shown in FIG. 2, camera 206(1) generates a given frame 210(1) that depicts one view of the environment, and camera 206(X) generates a different frame 210(X) that depicts a different view of the environment. For example, each camera 206 may generate a new video frame 210 that depicts an area in front of, behind, to the side of, below, and/or above a vehicle or another system.

Each camera 206 may also generate a new video frame 210 at a certain frame rate. For example, a given camera 206 may output a new video frame 210 a certain number of milliseconds after outputting a previous video frame 210.

Although described primarily with respect to cameras (or image sensors) generating image/video frames, this is not intended to be limiting, and in some embodiments additional or alternative sensor modalities may be used without departing from the scope of the present disclosure. For example, sensor data representations (e.g., point clouds, projection images, range images, etc.) generated using LiDAR sensors, RADAR sensors, ultrasonic sensors, depth sensors, stereo cameras, etc. may be used in addition to or in lieu of camera frames.

Processing engine 122 processes a set of frames 210 captured by cameras 206 at substantially the same point in time. For example, processing engine 122 may process frames 210 from cameras 206 at a given interval or frequency, which can be the same as or different from the frame rates with which cameras 206 capture frames 210. Processing engine 122 may convert pixel values in each frame 210 from a multi-planar YUV color format into a packed RGBA color format. Within each converted frame 210, the red, green, and blue channels may be used to store color values for pixels in the frame, while the alpha channel in the pixel locations may be unused because the alpha channel typically specifies the transparency or opacity of a color and image content in frames 210 is opaque. Although the RGBA color format is described, this is not intended to be limiting, and other color formats may be used without departing from the scope of the present disclosure.

During processing of a set of frames 210 at a given time, processing engine 122 computes a sequence number 208 for the set of frames 210 and inserts the computed sequence number 208 into pixel values within the set of frames 210. Continuing with the above example, processing engine 122 may compute sequence number 208 for a newly received set of frames 210 by incrementing or decrementing a sequence number for a preceding set of frames by a fixed or known amount. Processing engine 122 may also store the computed sequence number 208 in the previously unused alpha channel component of each RGBA pixel in frames 210. When the computed sequence number 208 falls outside a range of valid sequence number values (e.g., a range of values that can be stored in the alpha channel component of an RGBA pixel), processing engine 122 may "wrap" the computed sequence number 208 around (e.g., via a modulo or other type of arithmetic operation) so that sequence number 208 stays within the range of valid sequence number values.

Thus, an 8-bit alpha channel in each RGBA pixel of frames 210 can store up to 256 unique values for sequence number 208 when sequence number 208 is incremented or decremented by 1. To account for potential imprecision associated with conversion of the alpha channel from an 8-bit unsigned integer representation to a 32-bit floating point representation and back (e.g., during subsequent transformations 214 applied to pixel values in frames 210), sequence number 208 may be incremented or decremented by a value that is greater than one (e.g., 2 or 3) without adversely impacting the tracking or comparison of sequence number 208 across consecutive frames.

Processing engine 122 also combines image data from the converted frames 210 into one or more output frames 212(1)-212(Y). Each of output frames 212(1)-212(Y) is referred to individually herein as output frame 212 and can be used in a corresponding visualization 236 associated with the environment captured by cameras 206. For example, output frames 212 may be used to generate a top-down visualization of the environment surrounding a vehicle. Output frames 212 may also, or instead, be used to generate a three-dimensional (3D) visualization of the environment from a given position, orientation, focal length (e.g., zoom), and/or another parameter associated with a virtual camera. Output frames 212 may also, or instead, be used to generate a multi-viewport visualization associated with the environment. The multi-viewport visualization divides a given output frame 212 into multiple regions corresponding to multiple camera 206 viewports. Each region of that output frame 212 includes a portion (or an entirety) of a given frame 210 captured by a corresponding camera 206.

More specifically, processing engine 122 generates each output frame 212 by applying one or more transformations 214 to one or more frames 210, regions of one or more frames 210, and/or other representations of pixel values or pixel locations in frames 210. For example, processing engine 122 may apply one or more projections, crops, rotations, stitching operations, blending operations, color adjustment operations, temporal noise reduction, spatial noise reduction, interpolation, and/or other types of transformations 214 in a certain order to one or more frames 210 to generate a corresponding output frame 212.

In some embodiments, processing engine 122 applies transformations 214 to frames 210 and/or generates output frames 212 based on user input 216 associated with the corresponding visualizations 236. For example, user input 216 may be provided via a display device 202, another I/O device, and/or a user interface associated with display device 202 or the I/O device. User input 216 may specify a camera perspective, a level of zoom, a rotation parameter, and/or another camera parameter that affects the way in which image data from a given set of frames 210 is depicted in a corresponding output frame 210. User input 216 may also, or instead, include a selection of camera 206 viewports, viewport sizes, and/or viewport positions used to generate a multi-viewport visualization 236. User input 216 may also, or instead, specify the type of visualization 236 (e.g., top-down, 3D, multi-viewport) to be generated from a given set of frames 210.

Because transformations 214 operate on RGB and/or other color values stored in pixels of frames 210 and not on alpha channel values in the pixels, transformations 214 do not remove or alter sequence number 208 that is stored in the alpha channel values of the pixels. Consequently, pixels of each output frame 212 that are generated from pixel values in one or more frames 210 include alpha channel values that store sequence number 208 from those frame(s) 210. Conversely, pixels of a given output frame 212 that are not generated from pixel values in one or more frames 210 (e.g., pixels in output frame 212 that represent regions of the environment that are not captured by one or more cameras 206) may include alpha channel values of 0 to indicate that these pixels should not be used to detect duplicated frame 210 content in that output frame 212. For example, output frame 212 may depict a top-down or 3D visualization of an environment around a vehicle. As a result, output frame 212 may be generated by stitching image data from multiple frames 210 captured by cameras 206 pointing outward from the vehicle. Because the interior or underside of the vehicle is not captured by any cameras 206, pixels in regions of output frame 212 that correspond to the interior or underside of the vehicle may include alpha channel values of 0.

An example operation of processing engine 122 can be illustrated using the following pseudocode:

```
Initialize SEQNO
FOR (each frame) {
  FOR (each camera) {
    FOR (each pixel) {
      alpha[pixel] = SEQNO
    }
  }
  Generate output frame from one or more frames
  Increment Seq No by increment, SEQINC (roll over on overflow)
}
```

In the above pseudocode, "SEQNO" represents sequence number 208 and is initialized to a certain value (e.g., 1) before any frames 210 are received. When a set of frames 210 is received from cameras 206 at a given time (e.g., at the frame rate associated with cameras 206 and/or at another interval), processing engine 122 sets the alpha channel value of each pixel in every frame 210 in the set to the current sequence number 208. After sequence number 208 has been stored in the alpha channel values of pixels in frames 210, processing engine 122 uses one or more frames 210 to generate a corresponding output frame 212. Processing engine 122 then increments sequence number 208 by a fixed increment denoted by "SEQINC" and rolls over sequence number 208 if the incremented value exceeds the range of valid alpha channel values in frames 210. Processing engine 122 repeats the process for subsequent sets of frames 210 received from cameras 206.

Verification engine 124 uses values of sequence number 208 stored in pixels of output frames 212 to verify that a given output frame 212 is not generated from duplicate image data in a corresponding set of frames 210. More specifically, verification engine 124 determines an expected sequence number 220 for each output frame 212 generated by processing engine 122. For example, verification engine 124 may compute expected sequence number 220 for a set of output frames 212 received at the same time by incrementing or decrementing a value of expected sequence number 220 for a preceding set of output frames 212 by a fixed or known amount. When expected sequence number 220 falls outside a range of valid sequence number values (e.g., a range of values that can be stored in the alpha channel component of an RGBA pixel), verification engine 124 may "wrap" expected sequence number 220 around so that expected sequence number 220 stays within the range of valid sequence number values.

Verification engine 124 also retrieves a set of sampled sequence numbers 222 from one or more pixels in each output frame 212. For example, verification engine 124 may sample alpha channel values from four pixels near the corners of a given output frame 212 that represents a top-down view, 3D view, and/or another type of view that is generated by stitching together image data from one or more frames 210. This type of output frame 212 may include a first portion of pixels that store pixel values and sequence number 208 derived from one or more frames 210 and a second portion of pixels that do not store pixel values and sequence number 208 from any frame 210. As mentioned above, the second portion of pixels may correspond to regions of an environment that are not captured by cameras 206. Because image data from frames 210 is most likely to be found in at least one corner of that output frame 212 (e.g., even when transformations 214 associated with a large amount of zoom cause the majority of output frame 212 to lack image data from frames 210), alpha channel values sampled near the corners of output frame 212 are more likely to include values of sequence number 208 from one or more frames 210 than alpha channel values sampled from the interior of output frame 212. Additionally, the four alpha channel values may be sampled from pixels that are offset from the corners of output frame 212 by a certain amount (e.g., four pixels) to avoid pixels that are past the edge of defined data (e.g., due to blurring, merging, or tearing at the edges of output frame 212).

In another example, verification engine 124 may receive, from processing engine 122, metadata that identifies, within a given output frame 212 that represents a multi-viewport view, various regions of pixels that correspond to camera 206 viewports depicted within that output frame 212. Verification engine 124 may retrieve, from that output frame 212, one or more sampled sequence numbers 222 as alpha channel values from pixels near the corners of each region that depicts a viewport. These sampled sequence numbers 222 can be used to detect whether frame 210 data from individual cameras 206 is duplicated within output frame 212.

In a third example, verification engine 124 may retrieve sampled sequence numbers 222 from a regularly spaced grid, a certain number of random pixel locations in output frame 212, and/or according to another sampling pattern that provides coverage of various regions in output frame 212. This sampling technique can be used with output frames 212 that represent different types of visualizations 236 and/or views and does not require knowledge of the layout of frame 210 data within any output frame 212.

Verification engine 124 performs one or more comparisons 224 of expected sequence number 220 for a given output frame 212 with sampled sequence numbers 222 retrieved from that output frame 212. Verification engine 124 also generates one or more verification results 226 based on comparisons 224. For example, verification engine 124 may compare expected sequence number 220 to non-zero alpha channel values sampled from a given output frame 212. If all non-zero alpha channel values match one another and expected sequence number 220, verification engine 124 may generate verification results 226 indicating that duplicated frame 210 content is not detected in that output frame 212. If any non-zero alpha channel values do not match one another and/or do not match expected sequence number 220, verification engine 124 may generate verification results 226 indicating that duplicated frame 210 content is detected in that output frame 212. If all of the sampled alpha channel values are set to 0, verification engine 124 may repeat the process by sampling a different set of alpha channel values from a different set of pixel locations in output frame 212. Verification engine 124 may also, or instead, generate verification results 226 indicating that no frame 210 content was found in the set of sampled alpha channel values.

Verification engine 124 also uses verification results 226 to control or manage the display of visualizations 236 that include output frames 212. For example, if verification results 226 indicate that a given output frame 212 does not include duplicated frame 210 content, verification engine 124 could blend that output frame 212 with overlay content to generate a composite frame and transmit the composite frame for display within a corresponding visualization 236 on display device 202. The composite frame may include visual guides from the overlay content. These visual guides may be overlaid onto certain portions of output frame 212 to assist a user with a task, such as parking a vehicle based on a top-down, 3D, multi-viewport, or another view of the environment around the vehicle represented by output frame 212. On the other hand, if verification results 226 indicate that a given output frame 212 includes duplicated frame 210 content, verification engine 124 may drop that output frame 212, send a command to blank a screen on display device 202, display a warning or alert on display device 202, or perform another action to prevent a user from performing a task (e.g., parking or operating a vehicle) using stale, misleading, or less reliable than desired image data. If verification results 226 indicate that no frame 210 content was found in the set of sampled sequence numbers 222 (e.g., if all sampled sequence numbers 222 retrieved from one or more sets of pixel values in output frame 212 are set to 0), verification engine 124 may send a command to blank a screen on display device 202, or verification engine 124 may transmit output frame 212 and/or a corresponding composite frame for display on display device 202.

An example operation of verification engine 124 can be illustrated using the following pseudocode:

```
Initialize SEQNO, failure_count
FOR (each output frame) {
  FOR (selected pixels) {
    IF((alpha[pixel] > 0) && (alpha[pixel] != SEQNO)) {
      INCREMENT failure_count
      IF (failure_count > FAILURE_THRESHOLD) {
        INVOKE screen blanking
      }
    }
  }
  IF failure_count NOT INCREMENTED, reset failure_count
  Increment Seq No by increment, SEQINC (roll over on overflow)
}
```

In the above pseudocode, "SEQNO" represents sequence number 208, and "failure_count" represents a count of the number of times in which non-zero alpha channel values sampled from a given set of output frames 212 fail to match sequence number 208. Each of "SEQNO" and "failure_count" is initialized to a certain value (e.g., 0) before any output frames 212 are received. After a set of output frames 212 is received from processing engine 122 (e.g., at an interval at which output frames 212 are generated by processing engine 122), verification engine 124 selects a certain set of pixels in each output frame 212. Verification engine 124 also determines whether the alpha channel value of each selected pixel is greater than 0, and also compares the alpha channel value to the current sequence number 208. If any non-zero alpha channel value sampled from the set of pixels does not equal the current sequence number 208, verification engine 124 increments "failure_count."

After "failure_count" exceeds a numeric "FAILURE_THRESHOLD," verification engine 124 causes the screen on display device 202 to be blanked. The value of "FAILURE_THRESHOLD" can be set or configured to allow for transient errors, subject to a Fault Tolerant Time Interval (FTTI) for the system in which processing engine 122 and verification engine 124 execute. If all non-zero alpha channel values from the set of pixels sampled from a given set of output frames 212 equal the current sequence number 208, verification engine 124 resets "failure_count" (e.g., to 0) to indicate that any transient error has been resolved.

After selected pixels from a given output frame 212 have been processed, verification engine 124 increments sequence number 208 by a fixed increment denoted by "SEQINC" and rolls over sequence number 208 if the incremented value exceeds the range of valid alpha channel values in frames 210. Verification engine 124 repeats the process for subsequent sets of output frames 212 received from processing engine 122.

While the operation of processing engine 122 and verification engine 124 has been described above with respect to values of sequence number 208 that are stored in the alpha channel of RGBA pixels in frames 210 and output frames 212, it will be appreciated that other types of data elements associated with frames 210 and output frames 212 can be used to store sequence number 208. For example, sequence number 208 may be stored in a region of memory associated with each frame 210 and/or output frame 212. When data for a given frame 210 and/or output frame 212 is read from the memory, sequence number 208 is retrieved as a part of that data. In another example, sequence number 208 may be stored in metadata, video copyright data, compression tags, or other data elements that are not separated from the corresponding frames 210 and/or output frames 212 during processing by processing engine 122.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 500 of FIGS. 5A-5D, example computing device 600 of FIG. 6, and/or example data center 700 of FIG. 7.

Figure 3:
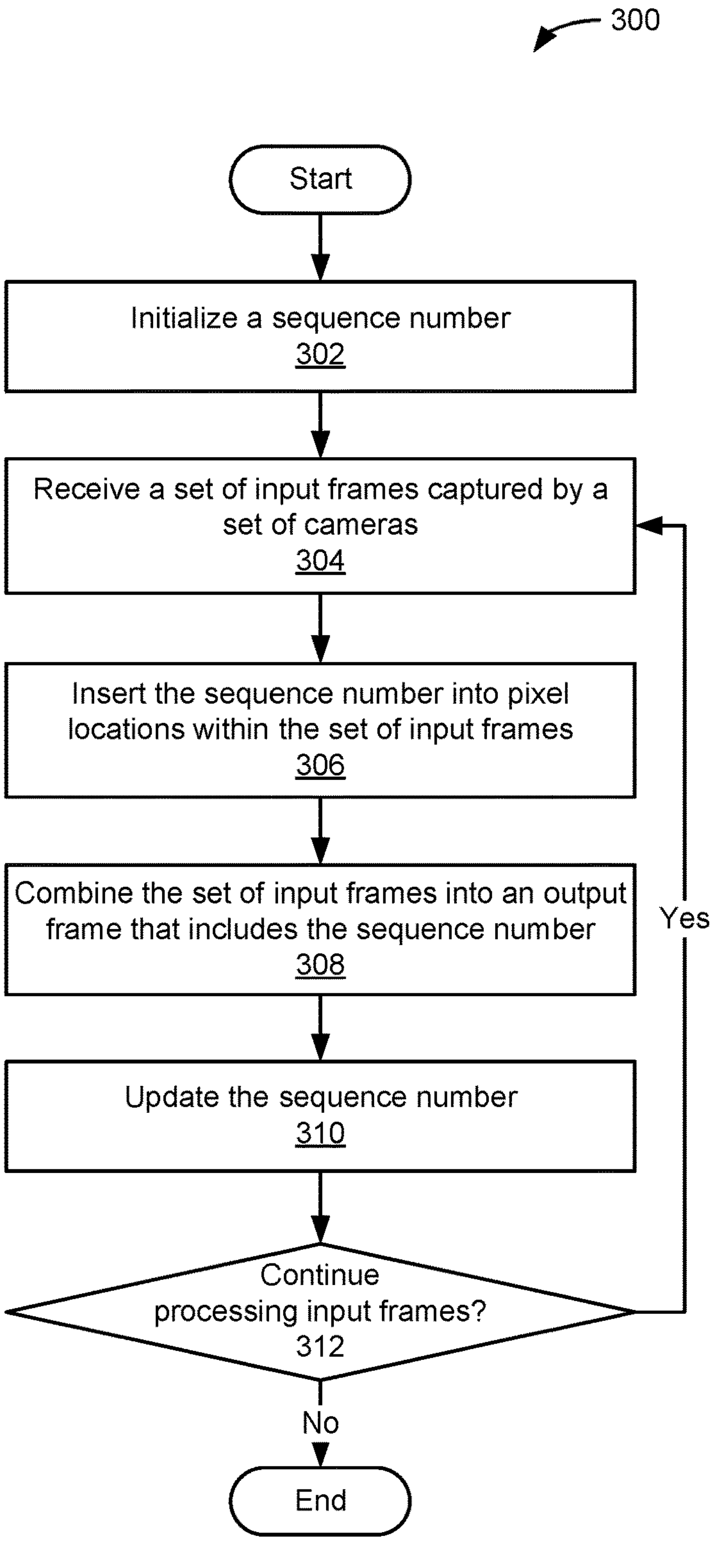
FIG. 3 illustrates a flow diagram of a method for processing frames associated with one or more camera views, according to various embodiments.
Figure 4:
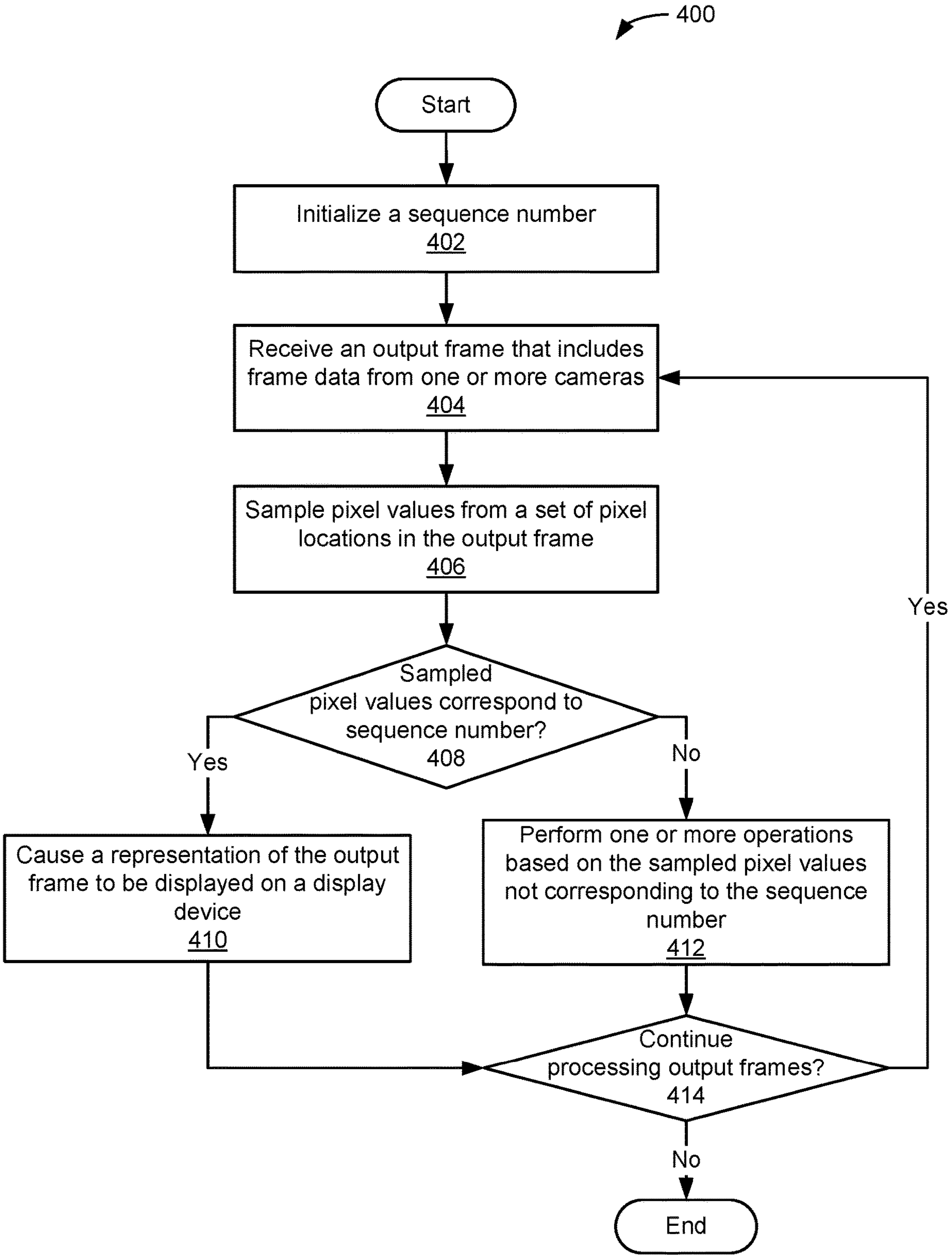
FIG. 4 illustrates a flow diagram of a method for verifying output frames associated with one or more camera views, according to various embodiments.

Now referring to FIGS. 3-4, each block of methods 300 and 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 300 and 400 are described, by way of example, with respect to the systems of FIGS. 1-2. However, these methods may additionally or alternatively be executed by any one system, or any combination of systems, including, but not limited to, those described herein. Further, the operations in methods 300 and 400 can be omitted, repeated, and/or performed in any order without departing from the scope of the present disclosure.

FIG. 3 illustrates a flow diagram of a method 300 for processing frames associated with one or more camera views, according to various embodiments. As shown in FIG. 3, method 300 begins with operation 302, in which processing engine 122 initializes a sequence number. For example, processing engine 122 may initialize the sequence number to a starting non-zero value that falls within a range of valid sequence numbers.

In operation 304, processing engine 122 receives a set of frames captured by a set of cameras. For example, processing engine 122 may retrieve the frames from the cameras, a set of buffers or deserializers associated with the cameras, and/or another source of frame data at a certain interval or frequency, which can be the same as or different from the frequency with which new frames are generated by the cameras.

In operation 306, processing engine 122 inserts the sequence number into pixel locations within the set of input frames. For example, processing engine 122 may store the sequence number in alpha channel values of RGBA pixels in the input frames.

In operation 308, processing engine 122 combines the set of input frames into an output frame that includes the sequence number. For example, processing engine 122 may use one or more projection, rotation, cropping, translation, stitching, blending, interpolation, or color-adjustment operations to combine the input frames into the output frame. These operations may be performed based on a type of visualization (e.g., top-down view, 3D view, multi-viewport view, etc.) represented by the output frame. These operations may also, or instead, be performed based on user input that specifies a camera perspective, rotation, zoom, and/or another parameter that affects the way in which image data from the input frames is depicted within the output frame.

In operation 310, processing engine 122 updates the sequence number. For example, processing engine 122 may increment or decrement the sequence number by a fixed amount. If the resulting value falls outside of a range of valid sequence numbers (e.g., a range of non-zero values that can be stored in the alpha channel of an RGBA pixel), processing engine 122 may use a modulo operation and/or another type of arithmetic operation to wrap the value around so that a valid sequence number is produced.

In operation 312, processing engine 122 determines whether or not to continue processing input frames. For example, processing engine 122 may continue to process input frames while the input frames are generated by the cameras and/or while the input frames are used to generate output frames that are used in one or more visualizations. While processing engine 122 continues processing input frames, processing engine 122 repeats operations 302, 304, 306, 308, and 310 for each set of input frames. Processing engine 122 may continue processing input frames in this manner until output frames that combine image data from the input frames are no longer generated.

Now referring to FIG. 4, FIG. 4 illustrates a flow diagram of a method 400 for verifying output frames associated with one or more camera views, according to various embodiments. As shown in FIG. 4, method 400 begins with operation 402, in which verification engine 124 initializes a sequence number. For example, verification engine 124 may initialize the sequence number to a starting non-zero value that falls within a range of valid sequence numbers.

In operation 404, verification engine 124 receives an output frame that includes frame data from one or more cameras. For example, verification engine 124 may receive the output frame from processing engine 122, a set of buffers, and/or another source of frame data at a certain interval or frequency, which can be the same as or different from the frequency with which new frames are generated by the cameras.

In operation 406, verification engine 124 samples pixel values from a set of pixel locations in the output frame. For example, verification engine 124 may sample alpha channel values from pixels that are near the corners of the output frame, near the corners of different viewports depicted in the output frame, evenly or regularly spaced within the output frame, and/or randomly located within the output frame.

In operation 408, verification engine 124 determines whether the sampled pixel values correspond to the sequence number. For example, verification engine 124 may determine a correspondence between a set of non-zero sampled pixel values and the sequence number as an exact match between each non-zero sampled pixel value and the sequence number, a non-zero sampled pixel value that is within a certain range or threshold of the sequence number, a certain number or proportion of non-zero sampled pixel values that exactly match or fall within a certain range or threshold of the sequence number, or based on another comparison of each non-zero sampled pixel value and the sequence number.

If the sampled pixel values correspond to the sequence number, verification engine 124 performs operation 410, in which verification engine 124 causes a representation of the output frame to be displayed on a display device. For example, verification engine 124 may transmit the output frame to the display device to allow the output frame to be shown on a screen within the display device. In another example, verification engine 124 may blend the output frame with an overlay into a composited frame and transmit the composited frame for display on the display device. The composited frame may include image data from the output frame that depicts a visualization of an environment surrounding a vehicle (or another system), as well as visual guides from the overlay that assist a user with operating the vehicle or performing another task.

If the sampled pixel values do not correspond to the sequence number, verification engine 124 performs operation 412, in which verification engine 124 performs one or more operations based on the sampled pixel values not corresponding to the sequence number. For example, verification engine 124 may transmit a command to blank the screen on the display device, drop the output frame instead of transmitting the output frame to the display device, display the output frame with a warning or splash screen that indicates that the output frame may include incorrect or inaccurate data, or perform other operations that prevent a user or operator from unknowingly using stale, misleading, or inaccurate image data in the output frame from being displayed on the displayed device.

In operation 414, verification engine 124 determines whether or not to continue processing output frames. For example, verification engine 124 may continue to process output frames while the output frames are generated by processing engine 122 and/or while the output frames are used in one or more visualizations that are outputted on the display device. While verification engine 124 continues processing output frames, verification engine 124 repeats operations 402, 404, 406, 408, 410, and 410 for each output frame. Verification engine 124 may continue processing output frames in this manner until output frames that combine image data from the input frames are no longer outputted on the display device.

The systems and methods described herein may be used by, without limitation, non-autonomous vehicles, semi-autonomous vehicles (e.g., in one or more adaptive driver assistance systems (ADAS)), autonomous vehicles, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle-infotainment (IVI) system and/or a surround view system (SVS) for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 5A:
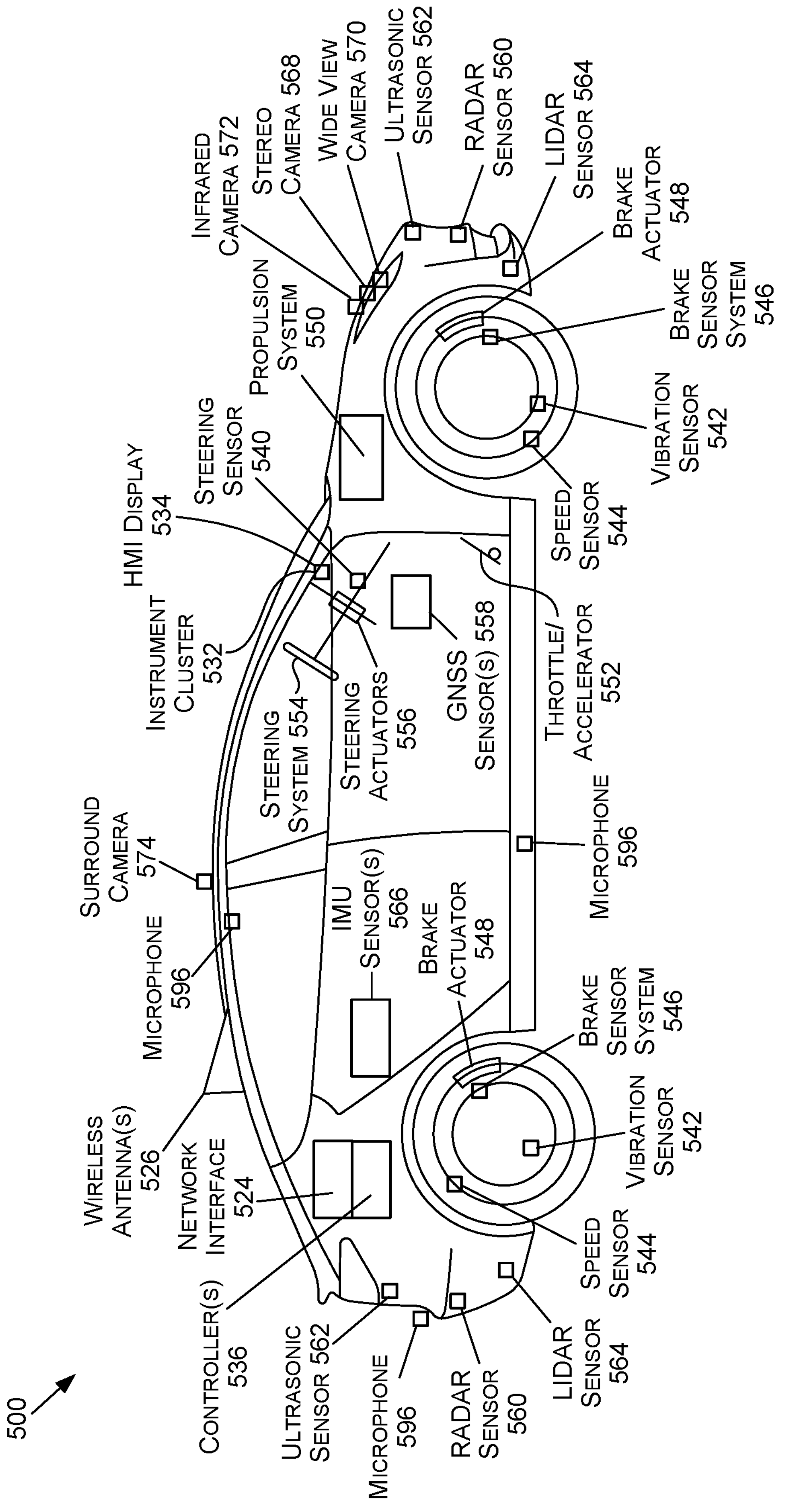
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree Cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types. In some embodiments, the sensor data includes frames 210 captured by one or more cameras 206.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 5B:
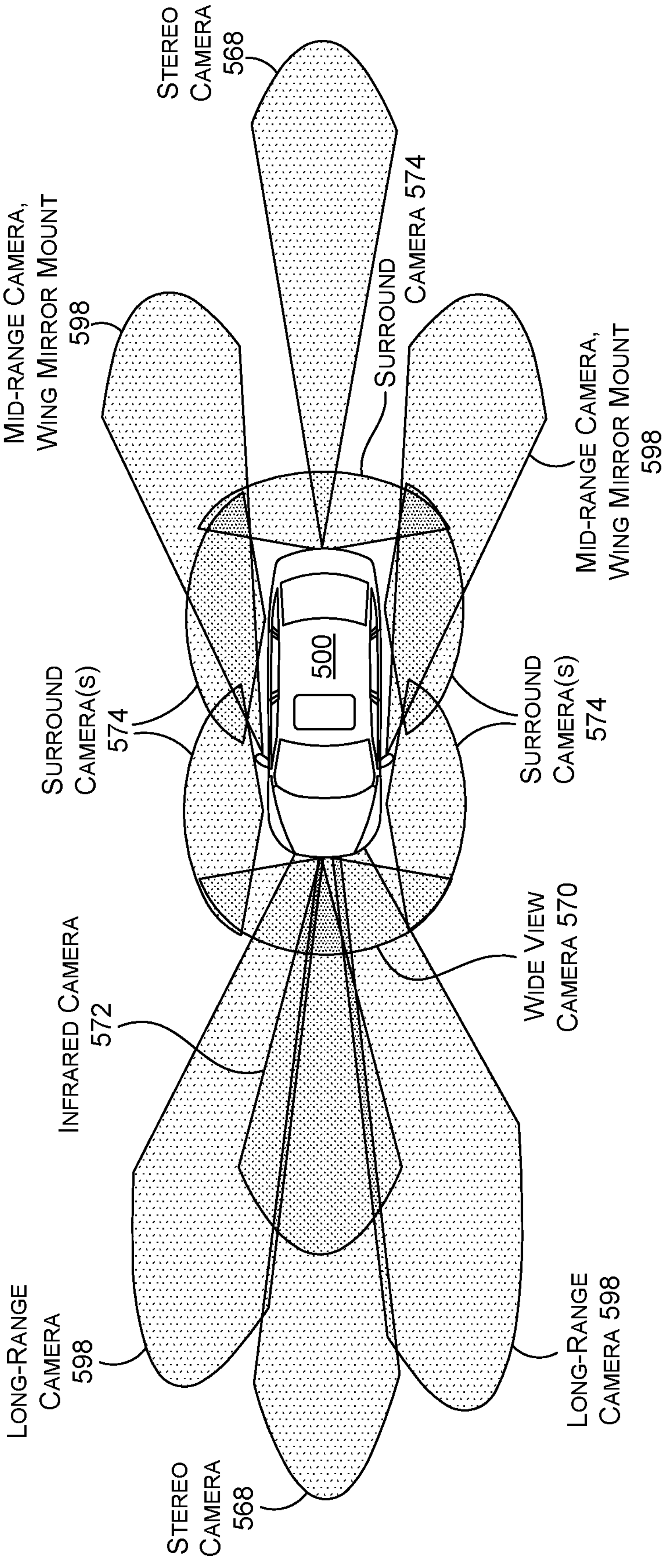
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

Any number of stereo cameras 568 may also be included in a front-facing configuration. In at least one embodiment, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree Camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

As described above, views and/or frames captured by various cameras can be combined via various transformations into output frames that represent top-down, 3D, multi-viewport, and/or other types of visualizations of the environment around the vehicle 500. Sequence numbers are inserted into pixels within these views and/or frames and transferred to the output frames. The sequence numbers can then be used to verify that the output frames do not include duplicate frame data from the cameras before displaying the output frames within one or more display devices (e.g., HMI display 534).

Figure 5C:
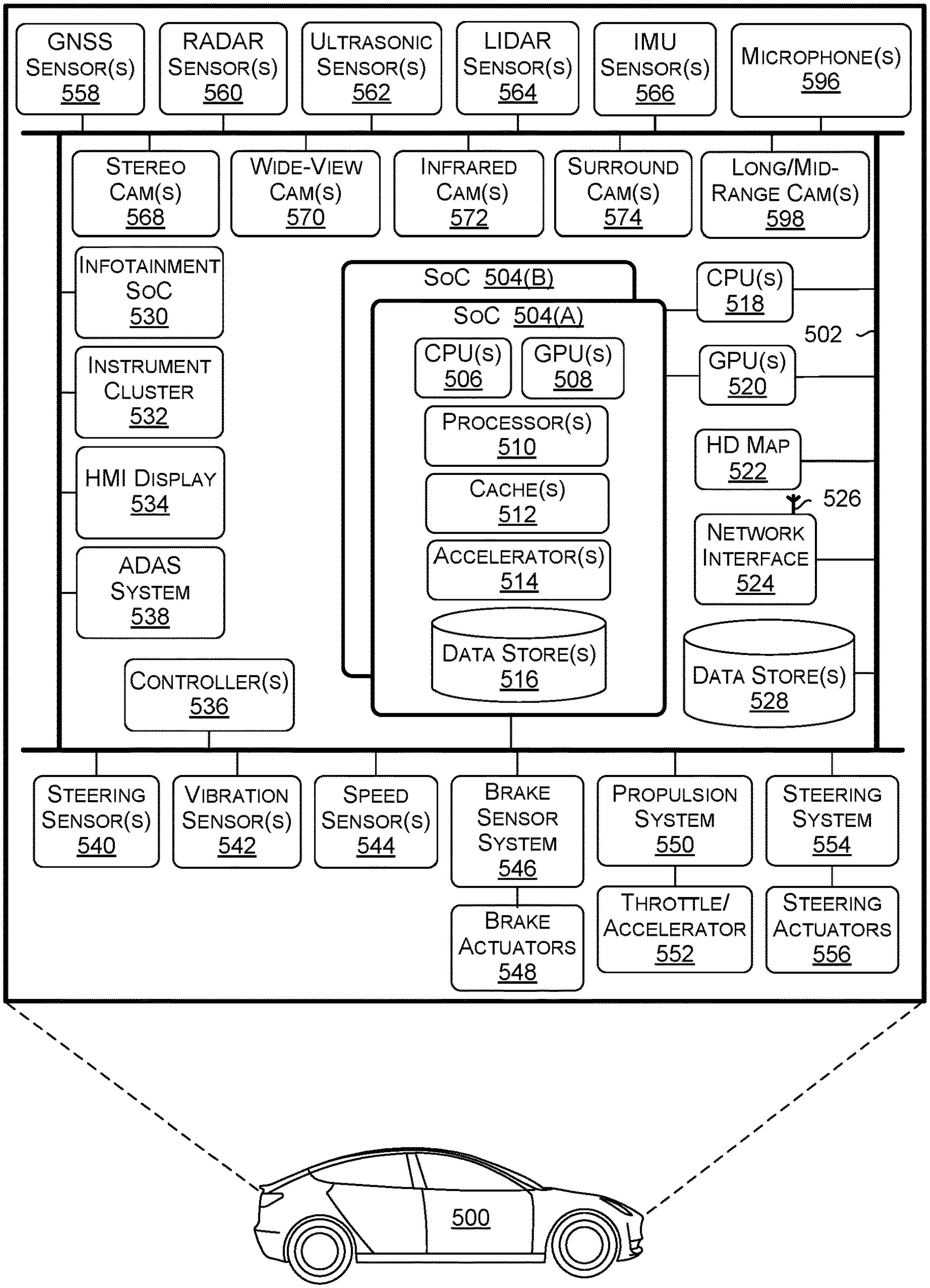
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree Field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
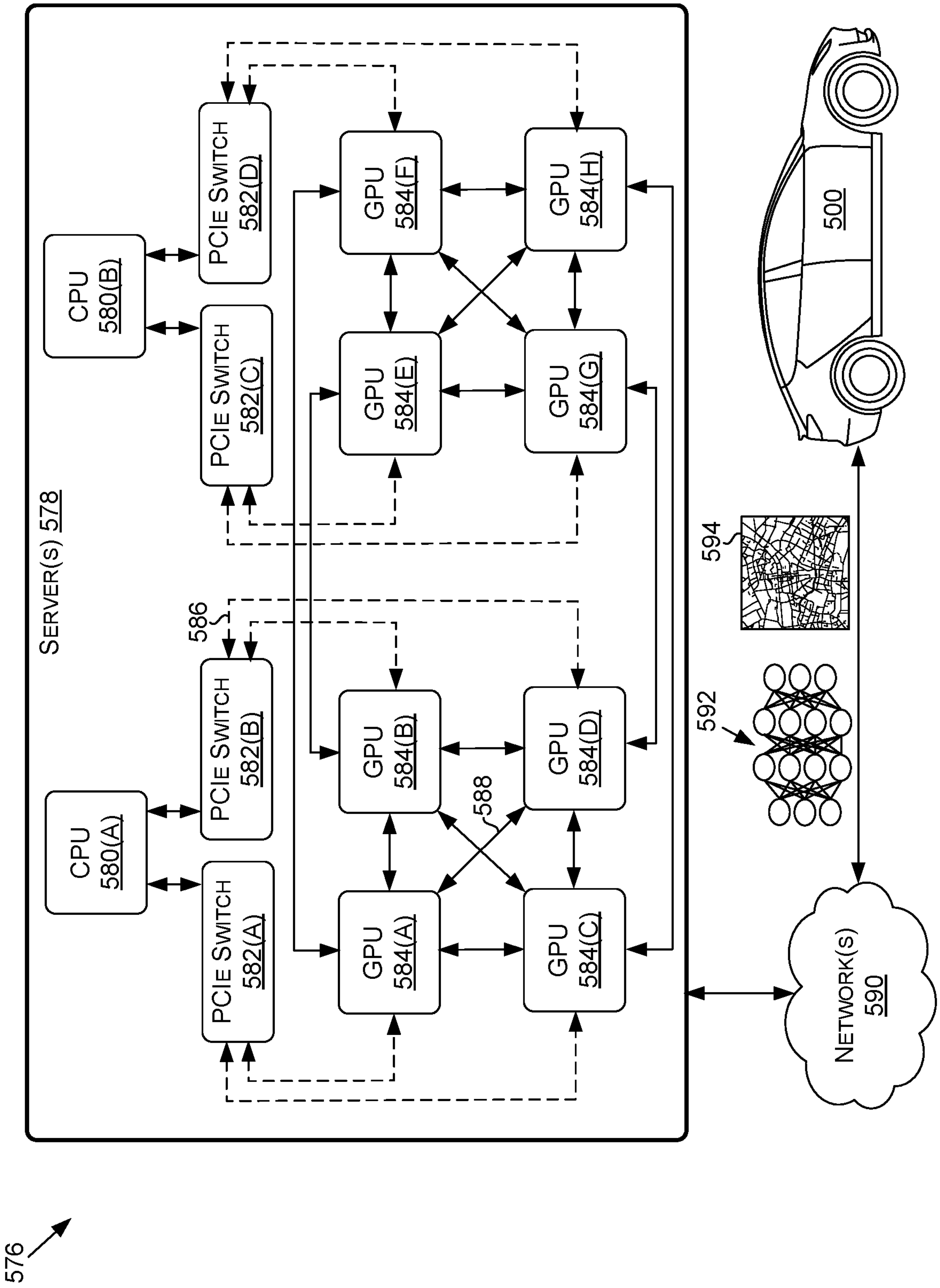
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
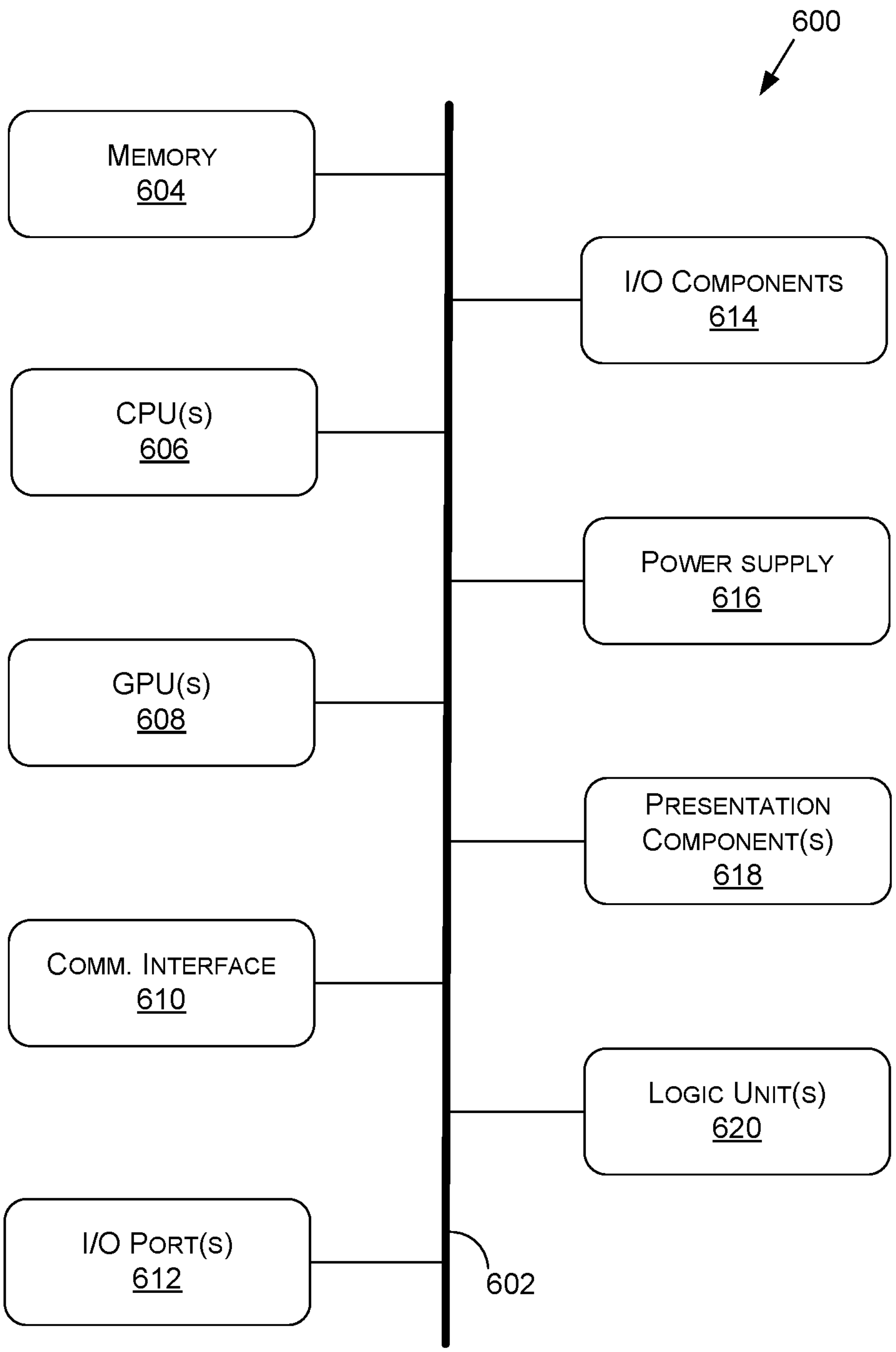
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device (e.g., display device 202), may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.). In some embodiments, the outputted data includes one or more visualizations of an environment around a vehicle or system in which computing device 600 resides. These visualizations are generated via stitching, blending, or other types of transformations applied to image data by CPU(s) 606 and/or GPU(s) 608.

Example Data Center

Figure 7:
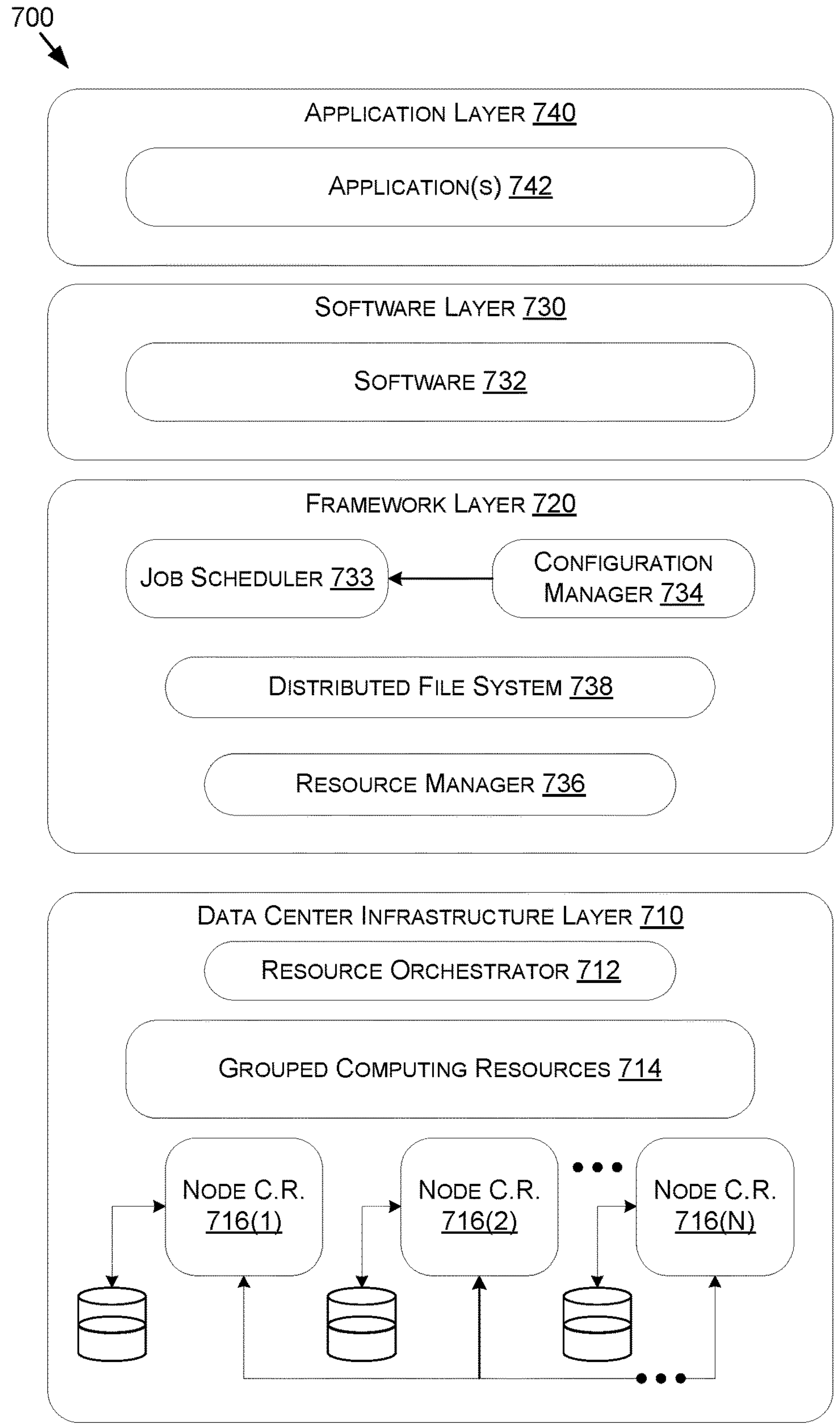
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, the disclosed techniques perform transformation-invariant detection of duplicate frames in automotive camera views or other types of visualizations that are generated by combining image data from one or more input frames. A sequence number is injected into the alpha channels of RGBA pixels in multiple input frames that are combined to generate the output frame. The sequence number is also incremented (or decremented) by a fixed or known amount before the sequence number is injected into the next set of input frames used to generate the next output frame of the visualization. The sequence number can be "wrapped around" when the sequence number lies outside a range of valid alpha channel values.

After the sequence number is inserted into a given set of input frames, the input frames are transformed, stitched, blended, and/or otherwise combined into a corresponding output frame. For example, the input frames may be combined to generate a top-down, 3D, or multi-viewport view of an environment around a vehicle or system. During generation of the output frame, the sequence number stored in the alpha channel of pixels in the input frames is transferred to the alpha channel of pixels in the output frame.

Values stored in the alpha channel of the output frame are sampled from a subset of pixels in the output frame and compared to an expected sequence number for the output frame. For example, the alpha channel values may be sampled from pixels in proximity to the corners of the output frame, and the expected sequence number may be determined by incrementing or decrementing a previous value of the expected sequence number. If all of the sampled alpha channel values match the expected sequence number for the output frame, the output frame is determined to not include duplicated frame content. The output frame can then be blended with an overlay into a visualization that is displayed on a screen in the vehicle.

If any of the sampled alpha channel values do not match the expected sequence number, the output frame is determined to include duplicated frame content. In response, the output frame can be dropped, and the screen can be blanked to prevent the driver from operating the vehicle using stale, misleading, or unsafe image data.

One technical advantage of the disclosed techniques relative to conventional solutions is that a sequence number inserted into a set of input frames can be transferred to a corresponding output frame in a manner that is invariant to the transformations performed to convert the input frames into the output frame. Accordingly, the sequence number can be used to detect duplicated frame content in output frames that are generated by rotating, cropping, stitching, blending, or otherwise transforming or combining input frames from multiple camera views. Further, the disclosed techniques allow duplicated frame content to be detected in an efficient manner by comparing a relatively small number of pixel values within the output frame to a corresponding sequence number.

1. In some embodiments, a method comprises determining a sequence number corresponding to an output frame, the output frame corresponding to one or more views captured using one or more cameras; performing a comparison of the sequence number with one or more pixel values of the output frame; and based at least on the comparison, preventing the output frame from being presented on a display device.

2. The method of clause 1, further comprising performing a second comparison of a second sequence number with one or more additional pixel values of a second output frame; and based at least on the second comparison, causing a presentation of the second output frame on the display device.

3. The method of any of clauses 1-2, wherein the causing the presentation comprises generating a composite frame, at least, by blending the second output frame with an overlay; and transmitting the composited frame for presentation on the display device.

4. The method of any of clauses 1-3, further comprising determining the sequence number to be associated with a set of input frames; inserting the sequence number into a set of pixels within the set of input frames; and combining the set of input frames to generate the output frame.

5. The method of any of clauses 1-4, further comprising combining a set of input frames to generate the output frame based at least on user input associated with a visualization of an environment captured using the one or more cameras.

6. The method of any of clauses 1-5, wherein the visualization comprises at least one of a three-dimensional (3D) view of the environment, a two-dimensional (2D) view of the environment, a top-down view of the environment, or a contiguous composite of a plurality of viewport views associated with the environment.

7. The method of any of clauses 1-6, further comprising combining a set of input frames to generate the output frame based at least on at least one of a projection operation, a rotation operation, a cropping operation, a translation operation, a stitching operation, or a blending operation.

8. The method of any of clauses 1-7, wherein the performing the comparison comprises comparing the sequence number with a set of alpha channel values from a set of pixel locations in the output frame, wherein the set of alpha channel values includes the one or more pixel values.

9. The method of any of clauses 1-8, wherein the performing the comparison further comprises retrieving the set of alpha channel values from the set of pixel locations in proximity to one or more corners of the output frame.

10. The method of any of clauses 1-9, wherein the performing the comparison comprises determining that the sequence number does not correspond to the one or more pixel values.

11. In some embodiments, a processor comprises one or more processing units to perform operations comprising determining a sequence number corresponding to an output frame, the output frame corresponding to one or more views captured using one or more cameras; determining, based at least on a comparison of the sequence number with one or more pixel values of the output frame, that the sequence number does not correspond to the one or more pixel values; and based at least on the sequence number not corresponding to the one or more pixel values, performing one or more operations with respect to the output frame.

12. The processor of clause 11, wherein the one or more operations include at least one of preventing the output frame from being presented on a display device, blanking a screen on the display device, or generating a warning associated with the output frame.

13. The processor of any of clauses 11-12, wherein the one or more processing units further perform operations comprising determining a second sequence number for a second output frame that temporally succeeds the output frame; determining, based at least on a second comparison of the second sequence number with one or more additional pixel values from the second output frame, that the second sequence number corresponds to the one or more additional pixel values; and based on the second sequence number corresponding to the one or more additional pixel values, causing a presentation of the second output frame on a display device.

14. The processor of any of clauses 11-13, wherein the determining the second sequence number comprises incrementing or decrementing the sequence number.

15. The processor of any of clauses 11-14, wherein the one or more processing units further perform operations comprising determining the sequence number is to be associated with a set of input frames; inserting the sequence number into a set of pixels within the set of input frames; and combining the set of input frames into the output frame based at least on user input associated with a visualization associated with the output frame.

16. The processor of any of clauses 11-15, wherein the comparison comprises retrieving the one or more pixel values as a set of alpha channel values from a set of pixel locations in one or more viewports within the output frame; and comparing the sequence number with the set of alpha channel values.

17. The processor of any of clauses 11-16, wherein the output frame comprises at least one of a three-dimensional (3D) view of an environment captured by the one or more cameras, a two-dimensional (2D) view of the environment, a top-down view of the environment, or a plurality of viewport views associated with the environment.

18. The processor any of clauses 11-17, wherein the processor is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

19. In some embodiments, a system comprises one or more processing units to determine a sequence number corresponding to an output frame that depicts one or more views captured using one or more cameras, and determine whether to cause presentation of the output frame on a display device based on a comparison of the sequence number with one or more pixel values of the output frame.

20. The system of clause 19, wherein the system is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:

determining an expected sequence number corresponding to an output frame, the output frame generated from a plurality of input frames corresponding to one or more views and captured using one or more cameras, wherein consecutive input frames captured by the one or more cameras are associated with different sequence numbers;

sampling, from each of one or more pixels included in the output frame, a pixel value stored in an alpha pixel channel associated with the pixel;

performing, for each of the one or more pixels included in the output frame, a comparison of the expected sequence number to the pixel value stored in the alpha pixel channel associated with the pixel, wherein a position of at least one of the one or more pixels corresponds to a position within a display device that is visible to a user;

based at least on the comparison, determining that the pixel value is outside of a predetermined threshold of the expected sequence number; and performing a safety action comprising at least preventing the output frame from being presented on the display device.

2. The method of claim 1, further comprising:

performing a second comparison of a second sequence number with one or more additional pixel values of a second output frame; and based at least on the second comparison, causing a presentation of the second output frame on the display device.

3. The method of claim 2, wherein the causing the presentation comprises:

generating a composite frame, at least, by blending the second output frame with an overlay; and transmitting the composite frame for presentation on the display device.

4. The method of claim 1, further comprising:

determining the sequence number to be associated with a set of input frames;

inserting the sequence number into a set of pixels within the set of input frames; and combining the set of input frames to generate the output frame.

5. The method of claim 1, further comprising combining a set of input frames to generate the output frame based at least on user input associated with a visualization of an environment captured using the one or more cameras.

6. The method of claim 5, wherein the visualization comprises at least one of a three-dimensional (3D) view of the environment, a two-dimensional (2D) view of the environment, a top-down view of the environment, or a contiguous composite of a plurality of viewport views associated with the environment.

7. The method of claim 1, further comprising combining a set of input frames to generate the output frame based at least on at least one of a projection operation, a rotation operation, a cropping operation, a translation operation, a stitching operation, or a blending operation.

8. The method of claim 1, wherein the performing the comparison comprises comparing the sequence number with a set of alpha channel values from a set of pixel locations in the output frame, wherein the set of alpha channel values includes the one or more pixel values.

9. The method of claim 8, wherein the performing the comparison further comprises retrieving the set of alpha channel values from the set of pixel locations in proximity to one or more corners of the output frame.

10. The method of claim 1, wherein the performing the comparison comprises determining that the sequence number does not correspond to the one or more pixel values.

11. The method of claim 1, wherein, for each of the one or more pixels, the pixel channel stores information exclusive of color information associated with the pixel.

12. A processor comprising:

one or more processing units to perform operations comprising:

determining an expected sequence number corresponding to an output frame, the output frame generated from a plurality of input frames corresponding to one or more views and captured using one or more cameras, wherein consecutive input frames captured by the one or more cameras are associated with different sequence numbers;

sampling, from each of one or more pixels included in the output frame, a pixel value stored in an alpha pixel channel associated with the pixel;

performing, for each of the one or more pixels included in the output frame, a comparison of the expected sequence number to the pixel value stored in the alpha pixel channel associated with the pixel, wherein a position of at least one of the one or more pixels corresponds to a position within a display device that is visible to a user;

based at least on the comparison, determining that the pixel value is outside of a predetermined threshold of the expected sequence number; and performing a safety action comprising at least preventing the output frame from being presented on the display device.

13. The processor of claim 12, wherein the one or more operations include at least one of preventing the output frame from being presented on a display device, blanking a screen on the display device, or generating a warning associated with the output frame.

14. The processor of claim 12, wherein the one or more processing units further perform operations comprising:

determining a second sequence number for a second output frame that temporally succeeds the output frame;

determining, based at least on a second comparison of the second sequence number with one or more additional pixel values from the second output frame, that the second sequence number corresponds to the one or more additional pixel values; and based on the second sequence number corresponding to the one or more additional pixel values, causing a presentation of the second output frame on a display device.

15. The processor of claim 11, wherein the one or more processing units further perform operations comprising:

determining the sequence number is to be associated with a set of input frames;

inserting the sequence number into a set of pixels within the set of input frames; and combining the set of input frames into the output frame based at least on user input associated with a visualization associated with the output frame.

16. The processor of claim 12, wherein the comparison comprises:

retrieving the one or more pixel values as a set of alpha channel values from a set of pixel locations in one or more viewports within the output frame; and comparing the sequence number with the set of alpha channel values.

17. The processor of claim 12, wherein the output frame comprises at least one of a three-dimensional (3D) view of an environment captured by the one or more cameras, a two-dimensional (2D) view of the environment, a top-down view of the environment, or a plurality of viewport views associated with the environment.

18. The processor of claim 12, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;
a system implemented using an edge device;
a system for generating or presenting at least one of virtual reality content, augmented reality content, or mixed reality content;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

19. A system comprising:
one or more processing units configured to:
determine an expected sequence number corresponding to an output frame generated from a plurality of input frames that depict one or more views captured using one or more cameras;
sample, from each of one or more pixels included in the output frame, a pixel value stored in an alpha pixel channel associated with the pixel; and
determine whether to cause presentation of the output frame on a display device based on a comparison of the expected sequence number with one or more pixel values stored in alpha pixel channels associated with the one or more pixels included in and sampled from the output frame, wherein the comparison is based at least on a predetermined threshold, and a position associated with at least one of the one or more pixel values corresponds to a location within the display device that is visible to a user.

20. The system of claim 19, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of virtual reality content, augmented reality content, or mixed reality content;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *